United States Patent
Holst et al.

(10) Patent No.: US 10,047,688 B2
(45) Date of Patent: Aug. 14, 2018

(54) IGNITION SYSTEM FOR INTERNAL COMBUSTION ENGINES

(71) Applicant: Caterpillar Motoren GmbH & Co. KG, Kiel (DE)

(72) Inventors: Hauke Holst, Altenholz (DE); Eike Joachim Sixel, Kiel (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 15/509,697

(22) PCT Filed: Aug. 10, 2015

(86) PCT No.: PCT/EP2015/001645
§ 371 (c)(1),
(2) Date: Mar. 8, 2017

(87) PCT Pub. No.: WO2016/041613
PCT Pub. Date: Mar. 24, 2016

(65) Prior Publication Data
US 2017/0284320 A1    Oct. 5, 2017

(30) Foreign Application Priority Data
Sep. 19, 2014  (EP) .................................. 14185593

(51) Int. Cl.
*F02D 41/00* (2006.01)
*F02B 19/12* (2006.01)
(Continued)

(52) U.S. Cl.
CPC ...... *F02D 41/0027* (2013.01); *F02B 19/1019* (2013.01); *F02B 19/12* (2013.01); *F02D 37/02* (2013.01); *F02D 2200/0602* (2013.01)

(58) Field of Classification Search
CPC ...... F02D 41/00; F02D 41/0027; F02D 37/02; F02D 2200/0602; F02B 19/10; F02B 19/12; F02B 19/1019
See application file for complete search history.

(56) References Cited

U.S. PATENT DOCUMENTS 2,412,821 A   12/1946   Malin et al.
3,066,661 A   12/1962   May
(Continued)

FOREIGN PATENT DOCUMENTS

DE   2507203 C2   7/1984
EP   0621402 A1   10/1994
(Continued)

OTHER PUBLICATIONS

European Patent Application No. 14185593.2 Search Report dated Jun. 25, 2015 (2 pages).
(Continued)

*Primary Examiner* — Hieu T Vo

(57) ABSTRACT

A method for operating a spark ignited gaseous fuel internal combustion engine is disclosed. The engine may have at least one main combustion chamber and at least one ignition device configured to initiate an ignition event within an ignition region. The method may include supplying pressurized fuel to the ignition region at times between about 30° to about 0° crank angle before the ignition event is initiated by the ignition device for enriching the ignition region with fuel. The method may also include initiating an ignition event in the ignition region for combusting an enriched air/fuel mixture within the ignition region.

20 Claims, 3 Drawing Sheets

(51) Int. Cl.
*F02B 19/10* (2006.01)
*F02D 37/02* (2006.01)

(56) References Cited

U.S. PATENT DOCUMENTS

| | | | |
|---|---|---|---|
| 3,066,662 | A | 12/1962 | May et al. |
| 4,188,923 | A | 2/1980 | Cochard et al. |
| 4,224,905 | A | 9/1980 | von Seggern et al. |
| 4,258,681 | A * | 3/1981 | Gruden .............. F02B 19/108 |
| | | | 123/277 |
| 4,638,777 | A | 1/1987 | Fanner et al. |
| 5,024,193 | A | 6/1991 | Graze, Jr. |
| 6,347,612 | B1 * | 2/2002 | Nishimura .......... F02D 41/0002 |
| | | | 123/295 |
| 6,681,739 | B2 * | 1/2004 | Mamiya ................ F02D 37/02 |
| | | | 123/295 |
| 7,100,567 | B1 | 9/2006 | Bailey et al. |
| 7,370,626 | B2 * | 5/2008 | Schubert .............. F02B 19/12 |
| | | | 123/209 |
| 8,874,352 | B2 * | 10/2014 | Delpech .............. F02D 19/0647 |
| | | | 123/406.22 |
| 2006/0254560 | A1 | 11/2006 | Mann et al. |

FOREIGN PATENT DOCUMENTS

| | | |
|---|---|---|
| EP | 2246551 A1 | 11/2010 |
| EP | 2520780 A1 | 11/2012 |
| FR | 2216439 A1 | 8/1974 |
| GB | 1002694 A | 8/1965 |
| JP | H07-19143 A | 1/1995 |
| JP | 2000-110697 A | 4/2000 |
| WO | WO 93/08399 A | 4/1993 |
| WO | WO 2011/015329 A1 | 2/2011 |
| WO | 2013153642 | 10/2013 |
| WO | WO 2014/114846 A1 | 7/2014 |

OTHER PUBLICATIONS

PCT/EP2015/001645 International Search Report dated Dec. 8, 2015 (3 pages).

* cited by examiner

IGNITION SYSTEM FOR INTERNAL COMBUSTION ENGINES

CLAIM FOR PRIORITY

This application is a U.S. National Phase entry under 35 U.S.C. § 371 from PCT International Application No. PCT/EP2015/001645, filed Aug. 10, 2015, which claims benefit of priority of European Patent Application No. 14185593.2, filed Sep. 19, 2014, all of which are incorporated herein by reference.

TECHNICAL FIELD

The present disclosure generally relates to an ignition system, an ignition device, and a cylinder head for gaseous fuel internal combustion engines and further relates to a related method for operating internal combustion engines.

BACKGROUND

A known problem of operating an internal combustion engine is the generation of harmful nitrogen oxides. Those nitrogen oxides may form during combustion as a result of high peak combustion temperatures. Accordingly, reducing the peak combustion temperatures during combustion may generally reduce the formation of nitrogen oxides. For this reason, lean air fuel mixtures such as lean gaseous fuel air mixtures are used. A lean air fuel mixture has a relatively large air-to-fuel ratio compared to a fuel mixture having stoichiometric air-to-fuel ratio.

Operating an internal combustion engine with a relatively large air to fuel ratio (lean mixture) may result in an incomplete combustion within the main combustion chamber due to the relatively slow rate of flame propagation from a single point ignition source, such as a spark plug. Furthermore, a poor ignitability may result from the lean mixture. Particularly, large-bore engines may suffer from those effects.

To improve the ignitability of lean burn gaseous fuel internal combustion engines, the same may be provided with pre-chambers (also referred to as pre-combustion chambers). For example, such a pre-chamber may be fluidly connected to a main combustion chamber of a respective cylinder via, for example, a plurality of flow transfer passages, but at least one. Those flow transfer passages allow flow of a lean mixture of gaseous fuel and air from the main combustion chamber into the pre-chamber during a compression stroke. Enrichment of the lean mixture in the pre-chamber is typically effected by providing a small quantity of gaseous fuel into the pre-chamber via a separate gas feed passage. The enriched mixture is ignited in the pre-chamber by an igniter such as a spark plug. Ignition of the enriched mixture causes a flame front of hot gases that propagates from the pre-chamber via the flow transfer passages into the main combustion chamber. Thus, the lean mixture in the main combustion chamber ignites and burns, and, thereby, expands against a movable piston that drives a crankshaft.

For example, U.S. Pat. No. 5,024,193 of Caterpillar Inc. discloses a fuel combustion system with a pre-combustion chamber assembly defining a pre-chamber. The pre-chamber has a pre-selected shape and volume. A plurality of ejection passages of pre-selected geometric cross-section is provided for directing and controllably expanding burning gases from the pre-chamber into a main combustion chamber at a velocity greater than speed of sound.

The present disclosure is directed, at least in part, to improving or overcoming one or more aspects of prior systems.

SUMMARY OF THE DISCLOSURE

According to an aspect of the present disclosure, a method for operating a gaseous fuel internal combustion engine including at least one main combustion chamber and at least one ignition device configured to initiate an ignition event within the ignition region is disclosed. The method may comprise supplying pressurized fuel to the ignition region at times between about 30° to about 0°, particularly between about 10° to about 2° crank angle before the ignition event is initiated by the ignition device for enriching the ignition region with fuel. The method may further comprise initiating an ignition event in the ignition region for combusting the enriched air/fuel mixture within the ignition region.

According to another aspect of the present disclosure, an ignition system for an internal combustion engine including at least one main combustion chamber is disclosed. The ignition system may comprise an ignition device having an igniting portion defining an ignition region. The ignition device may be configured to initiate an ignition event in the ignition region for initiating a combustion process in the at least one main combustion chamber. The ignition system may further comprise at least one fuel supply channel configured to supply pressurized fuel into the ignition region for enriching the ignition region with fuel, wherein the pressurized fuel is supplied to the ignition region at times between about 30° and about 0°, particularly between about 10° and about 2° crank angle before the ignition event is initiated by the ignition device.

According to another aspect of the present disclosure, a gaseous fuel internal combustion engine may comprise at least one cylinder movably accommodating an associated piston, wherein the at least one cylinder and the associated piston may define a main combustion chamber for combusting an air/fuel mixture therein. The gaseous fuel internal combustion engine may further comprise at least one ignition system according to the present disclosure.

According to another aspect of the present disclosure, an ignition device for initiating an ignition event for igniting an air/fuel mixture within a gaseous fuel internal combustion engine including at least one combustion chamber is disclosed. The ignition device may comprise an ignition portion configured to generate and initiate an ignition event, wherein the ignition portion may define an ignition region disposed at least partially within the at least one combustion chamber. The ignition device may further comprise at least one fuel supply channel configured to supply pressurized fuel to the ignition region for enriching the ignition region with fuel, wherein the pressurized fuel may be supplied to the ignition region at times between about 30° and about 0°, particularly between about 10° and about 2° crank angle before the ignition event is initiated by the ignition device.

According to another aspect of the present disclosure, a cylinder head for a gaseous fuel internal combustion engine including at least one combustion chamber is disclosed. The cylinder head may comprise at least one inlet channel configured to supply an air/fuel mixture to the combustion chamber, at least one ignition device mounting section for accommodating at least one ignition device configured to initiate an ignition event in an ignition region for igniting the air/fuel mixture within the combustion chamber, and at least one fuel supply channel configured to supply pressurized fuel to the ignition region for enriching the ignition region with fuel. The pressurized fuel may be supplied to the ignition region at times between about 30° and about 0°, particularly between about 10° and about 2° crank angle before the ignition event is initiated by the ignition device.

Other features and aspects of this disclosure will be apparent from the following description and the accompanying drawings.

DETAILED DESCRIPTION

Figure 1:
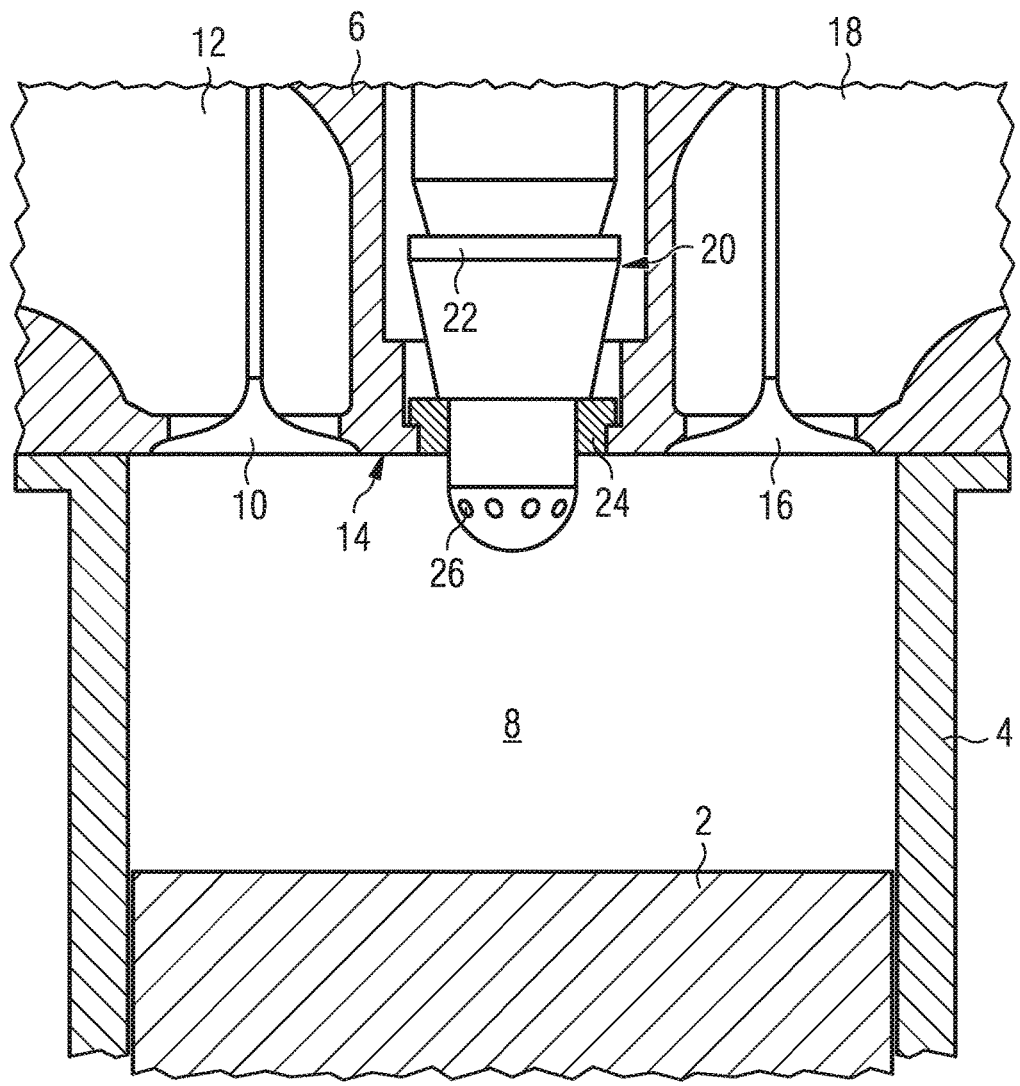
FIG. 1 is a schematic drawing of an upper section of an engine cylinder covered by a cylinder head only shown in part as well, the cylinder head comprising a pre-chamber assembly.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based at least in part on the realization that operating a main combustion chamber with a rich mixture of fuel and air may provide a very reliable operation of a lean burn gaseous fuel internal combustion engine. However, a considerable amount of nitrogen oxides may be generated in the enriched main chamber combusting the rich mixture. Said effect may particularly be relevant in large bore engines. Accordingly, it is proposed to provide the internal combustion engine with a fuel supply channel for supplying pressurized fuel to an ignition region disposed within the main combustion chamber. The main combustion chamber may be filled with a lean mixture of fuel and air. Then, shortly before the ignition event, pressurized fuel may be provided into the ignition region to at least partially generate a rich mixture in the ignition region by mixing the lean mixture and the separately supplied fuel. During operation of the engine, an ignition is caused in the main combustion chamber, for example, by a spark of a spark igniter. Flames generated in the ignition region may propagate and may initiated combustion within the main combustion chamber driven by an increased pressure through the combustion, for combusting the lean mixture therein. Accordingly, a reliable ignition due to the presence of a rich mixture of fuel and air is combined with a relatively low generation of nitrogen oxides.

The present disclosure may be based at least in part on the realization that the above-mentioned concept may be also applicable to any internal combustion engine utilizing a pre-chamber for promoting the ignition process in the main combustion chamber. Therefore, it is proposed to provide a pre-chamber assembly with a fuel supply channel for supplying pressurized fuel to an ignition region disposed within the pre-chamber. The pre-chamber may be filled with a lean mixture of fuel and air from the main combustion chamber during a compression stroke. Then, shortly before the ignition event, pressurized fuel may be provided into the ignition region to at least partially generate a rich mixture in the ignition region by mixing the lean mixture and the separately supplied fuel. During operation of the engine, an ignition is caused in the pre-chamber, for example, by a spark of a spark igniter. Flames generated in the pre-chamber may propagate from the pre-chamber into the main combustion chamber driven by an increased pressure through the combustion, for igniting the lean mixture therein.

The present disclosure may be further based at least in part on the realization that the pressurized fuel supplied to the ignition region may have a pressure being greater than a compressing pressure of an air/fuel mixture actually present at the time of the fuel supply.

The present disclosure may be further based at least in part on the realization that providing pressurized fuel to the ignition region may lead to an at least partially stratified air/fuel mixture within the main combustion chamber or the pre-chamber. An at least partially stratified air/fuel mixture within the main combustion chamber or the pre-chamber may be characterized by having a mixing in the main combustion chamber or the pre-chamber, that is that there is a plurality of different portions within the combustion chamber or the pre-chamber which have different air to fuel ratios. A mixing gradient in the pre-chamber may lead or result in a mixing gradient in the main combustion chamber. Due to the main combustion chamber or the pre-chamber enriched with pressurized fuel directly at the ignition region in combination with a lean mixture in the rest of combustion chamber, generation of NOx may be significantly reduced.

Although described in the following with respect to a pre-combustion assembly, the exemplary disclosed concept of supplying pressurized fuel to an ignition region of an ignition device, such as, for instance, a spark plug, may also be applicable to an ignition device having an ignition region disposed directly in a main combustion chamber of the internal combustion engine. In other words, the exemplary disclosed concept is also applicable to an internal combustion engine running at least partially on gaseous fuel and not provided with a pre-chamber assembly. Hence, pressurized fuel may be directly supplied to the ignition region disposed in the main combustion chamber.

The pressurized fuel supplied to the ignition region may be gaseous fuel, liquefied gaseous fuel, gasoline fuel, or kerosene. It should be appreciated that the present disclosure is generally applicable to any spark ignited internal combustion engine running at least partially on gaseous fuel.

Referring now to the drawings to explain the general principle of the present disclosure by way of example. FIG. 1 depicts a piston 2 movably arranged in a cylinder or cylinder line 4 of an internal combustion engine (not shown in further detail). The cylinder 4 is covered by a cylinder head 6. The piston 2, the cylinder 4, and the cylinder head 6 together define a main combustion chamber 8 of the internal combustion engine.

The piston 2 is reciprocatingly arranged in the cylinder 4 to move between a top dead center (TDC) and a bottom dead center (BDC) during operation of the internal combustion engine. For the purposes of the present disclosure, the internal combustion engine is considered as a four-stroke internal combustion engine operating at least partly on gaseous fuel such as a gas engine or a dual fuel engine. One skilled in the art will recognize, however, that the internal combustion engine may be any type of engine (turbine, gas, diesel, natural gas, propane, two-stroke, etc.) that would at least partially operate on gaseous fuel. Furthermore, the internal combustion engine may be of any size, with any number of cylinders, and in any configuration (V-type, in-line, radial, etc.). Moreover, the internal combustion engine may be used to power any machine or other device, including locomotive applications, on-highway trucks or vehicles, off-highway trucks or machines, earth moving equipment, generators, aerospace applications, marine applications, pumps, stationary equipment, or other engine powered applications.

The cylinder head 6 includes at least one inlet valve 10, for example a poppet valve. The inlet valve 10 is accommodated in an inlet channel 12 opening in a piston sided face 14 of the cylinder head 6 for supplying a lean mixture of gaseous fuel and air into the main combustion chamber 8. Similarly, at least one outlet valve 16, for example also a poppet valve, is accommodated in an outlet channel 18 of the cylinder head 6 to guide exhaust gas out of the main combustion chamber 8.

According to the embodiment shown in FIG. 1, the cylinder head 6 may further comprise a pre-chamber assembly 20 including a pre-chamber body 22 as is described in greater detail later on. A plurality of flow transfer passages 26 fluidly connects a pre-chamber 36 (not visible in FIG. 1) within the pre-chamber assembly 20 and the main combustion chamber 8 of the cylinder 4. However, the exemplary disclosed ignition system may also be applicable to internal combustion engines that at least partially operate on gaseous fuel, such as, for instance, natural gas, and that does not utilize a pre-chamber assembly 20 for promoting the combustion process within the main combustion chamber 8.

The pre-chamber assembly 20 is installed in the cylinder head 6 via a mounting body 24 as shown in FIG. 1. Alternatively, the pre-chamber assembly 20 may be installed in the cylinder head 6 in any other fashion.

Figure 2:
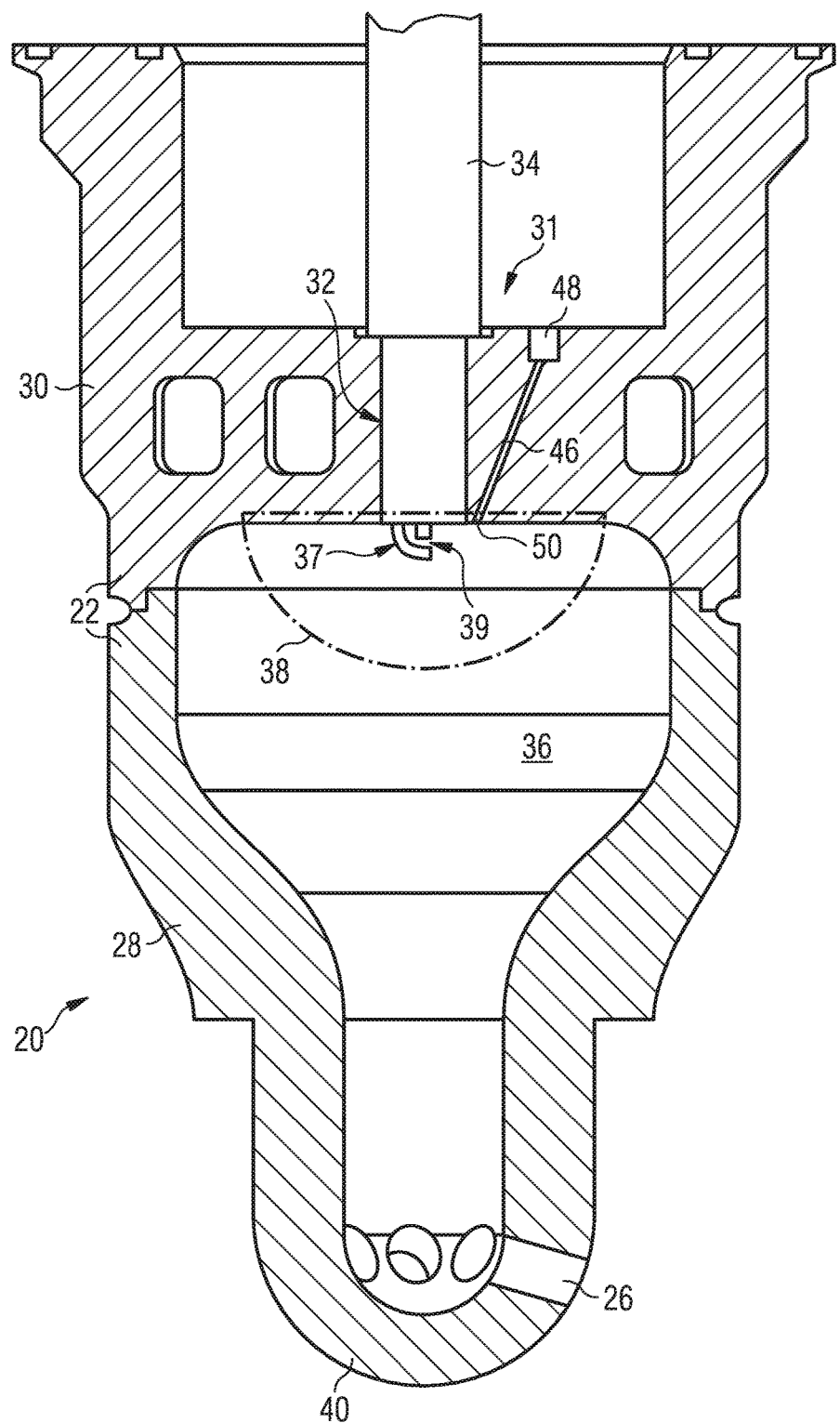
FIG. 2 is a schematic drawing of an ignition system according to an embodiment of the present disclosure and utilized in connection with a pre-chamber of an internal combustion engine.

Referring to FIG. 2, an exemplary embodiment of an ignition system 31 utilized in connection with a pre-chamber assembly 20 is shown in a schematic sectional view.

The pre-chamber assembly 20 includes pre-chamber body 22, which is formed of a first or lower body part (pre-chamber top) 28 and a second or upper body part (pre-chamber support) 30. Furthermore, the pre-chamber assembly 20 includes an ignition device mounting section 32 for removably accommodating an ignition device 34 of the ignition system 31.

The pre-chamber body 22 includes and defines a pre-chamber 36 and the flow transfer passages 26. The pre-chamber 36 is funnel-shaped and tapers in direction to the main combustion chamber 8. Alternatively, the pre-chamber 36 may have any other shape such as a cylindrical shape, pyramidal shape, conical shape, and combinations thereof. For example, the pre-chamber 36 may have a volume ranging from about 0.1% to about 20% of the compression volume of the cylinder 4 (see FIG. 1).

To fluidly connect the pre-chamber 36 to the main combustion chamber 8 (see FIG. 1), the flow transfer passages 26 are provided. The flow transfer passages 26 extend through a tip 40 of the pre-chamber body 22 along respective flow passage axes. Further, the flow transfer passages 26 may include a step-like shape and may be have rounding and/or chamfers at their respective inlets and outlets.

The tip 40 may be dome-shaped, or may be flattened or otherwise curved. In some embodiments, the tip 40 may reach into the main combustion chamber 8, or may be at least partially arranged in a cavity provided in the face 14 of cylinder head 6 (see FIG. 1).

The ignition system 31 may include an ignition device 34, for example a spark plug, a laser or plasma igniter, an ignition fuel injector, or a glow plug, at least partially installed in pre-chamber assembly 20 and mounted to the ignition device mounting section 32. Specifically, the ignition device 34 is operably connected to the pre-chamber 36.

Operably connected as used herein means that the ignition device 34 is—depending on its ignition mechanism—configured and arranged to ignite an ignitable mixture in the pre-chamber 36. For example, in case that the ignition device 34 is a spark plug, the same may extend into the pre-chamber 36. Specifically, electrodes of the spark plug may reach into the pre-chamber 36 such that a spark between those electrodes ignites a mixture in the pre-chamber 36. The pre-chamber 36 could also be designed to include the electrodes. The outer body of the pre-chamber could be the ground electrode of the ignition device and a center electrode could also be part of the chamber. As another example, in case of the ignition device 34 being a laser igniter, the same may be separated from the pre-chamber 36 via a window that is configured to transmit a laser beam from said laser igniter into the pre-chamber 36.

As shown in FIG. 2, the ignition device 34 has an igniting portion 37 where an ignition event is initiated and includes an ignition region 38 including and substantially surrounding the igniting portion 37. For example, in case of a spark plug configured to generate a spark at a spark gap 39, the ignition region 38 may surround the spark gap 39 with distance ranging from about 0.1 mm to about 15 mm. That is that the ignition region 38 is a portion that includes closely surrounds the igniting portion 37 where the ignition is initiated.

Figure 3:
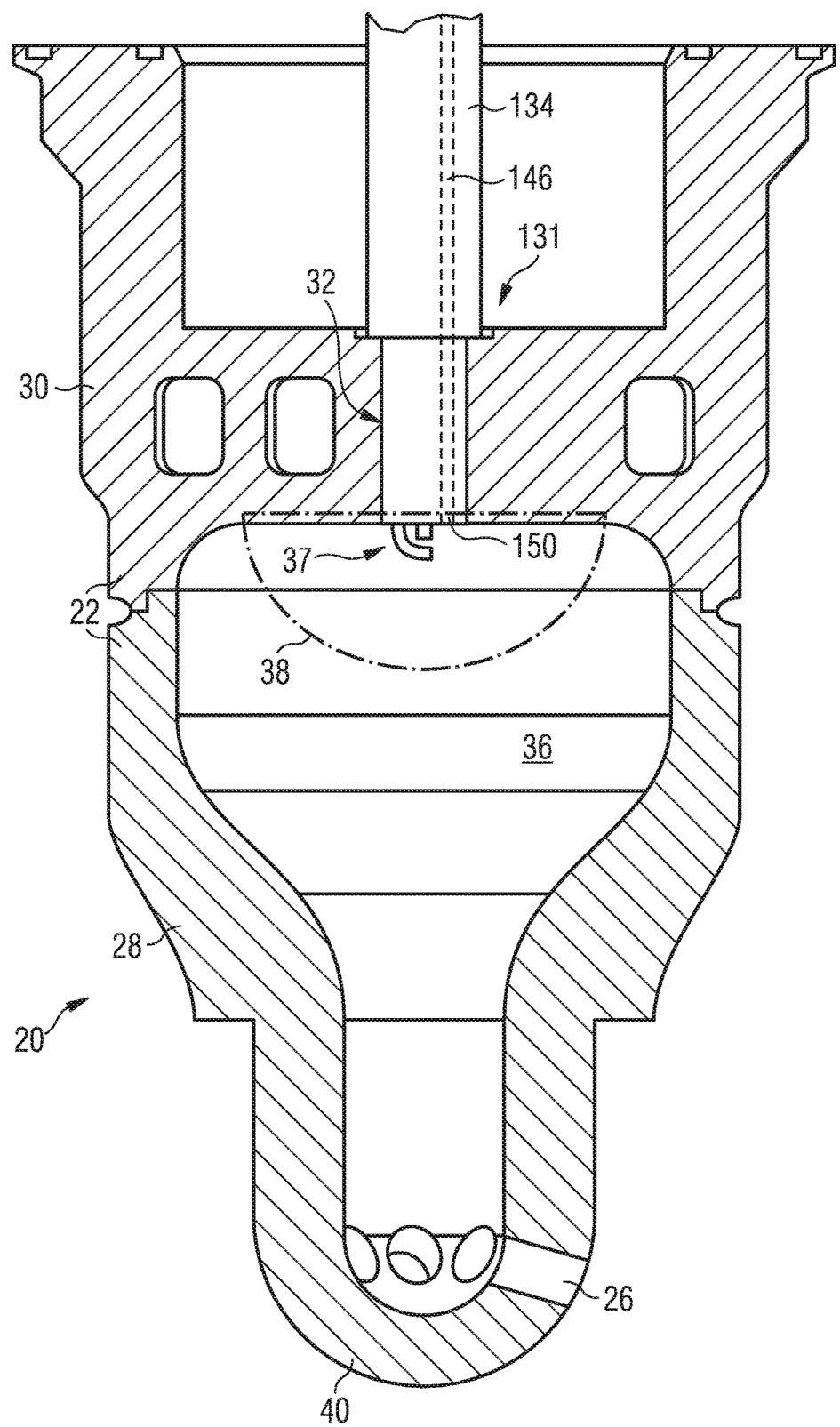
FIG. 3 is a schematic drawing of an ignition system according to a further embodiment of the present disclosure.

In the example shown in FIG. 3, the ignition region 38 is part of the pre-chamber 36. However, in some embodiments in which no pre-chamber is provided, the ignition region 38 may be part of, for instance, the main combustion chamber 8.

The ignition system 31 further includes a fuel supply channel 46 opening into the ignition region 38 for supplying pressurized fuel, for example pressurized fuel, to the ignition region 38 for enriching the same with fuel. In the embodiment shown in FIG. 2, the fuel supply channel 46 fully extends through the pre-chamber body 22, particularly through the upper pre-chamber part 30, from an inlet port 48 to an outlet port 50 opening into the ignition region 38. However, in some embodiments in which no pre-chamber is provided, the fuel supply channel 46 may fully extend through the cylinder head 6, also from an inlet port (similar to the inlet port 48) to an outlet (similar to the outlet 50) opening into the ignition region 38.

For example, a fuel supply line (not shown in FIG. 2) may be connected to the inlet port 48. Additionally, at least one control valve (not shown in FIG. 2) may be installed in or fluidly connected upstream of the fuel supply channel 46 to control the amount of pressurized fuel supplied to the ignition region 38 via the fuel supply channel 46. Furthermore, at least one check valve (not shown in FIG. 2), such as, for example, an electromagnetic valve, may be installed in or fluidly connected upstream of the fuel supply channel 46 to selectively allow or disallow a flow of fuel from a fuel supply, through the fuel supply channel 46, and into the ignition region 38.

The fuel supply channel 46 may have a diameter ranging from, for example, about 0.1 mm to about 10 mm. Due to the small diameters of the fuel supply channel 46, any flames generated during an ignition event of the ignition device 34 may only partially penetrate into the fuel supply channel 46 and may be extinguished prior penetrating too deep into the fuel supply channel 46. This may protect the upstream arranged control valves and/or check valves from the flames and a height temperature and, hence, may ensure proper operation of the respective control valves and check valves.

In some embodiments, the ignition device 34 and the fuel supply channel 46 may be separately provided, for example as described herein with reference to the exemplary embodiment shown in FIG. 2. Alternatively, the ignition device 34 and the fuel supply channel 46 may be provided as an integrated unit as described with reference to the exemplary embodiment shown in FIG. 3.

The ignition system 131 shown in FIG. 3 is substantially identical to the fuel ignition system 31 shown in FIG. 2, but differs in the arrangement of the fuel supply channel. Therefore, same parts are provided with same reference signs in FIGS. 2 and 3.

As shown in FIG. 3, the ignition system 131 includes an ignition device 134 accommodated in the ignition device mounting section 32. The ignition device 134 includes an igniting portion 37 and a fuel supply channel 146. The fuel supply channel 146 opens into the ignition region 38 via an outlet 150. As described above, a fuel supply line (not shown in FIG. 3) may be connected to the fuel supply channel 146. Additionally, at least one control valve (not shown in FIG. 2) may be installed in or fluidly connected upstream of the fuel supply channel 146 to control the amount of pressurized fuel supplied to the ignition region 38 via the fuel supply channel 146. Furthermore, at least one check valve (not shown in FIG. 3) may be installed in or fluidly connected upstream of the fuel supply channel 146 to selectively allow or disallow a flow of fuel from a fuel supply, through the fuel supply channel 146, and into the ignition region 38.

INDUSTRIAL APPLICABILITY

The ignition system as generally disclosed herein is applicable in gaseous fuel internal combustion engines. Particularly, the ignition system is applicable in gaseous fuel internal combustion engines operating on a lean mixture of gaseous fuel and air for reducing the generation and emission of nitrogen oxides and/or improving ignition reliability. However, the above-described concept of enriching the ignition region may also be applicable to internal combustion engines at least partially operating on gaseous fuel and not utilizing a pre-chamber assembly. In such embodiments, the additional pressurized fuel may be supplied to the ignition region of the ignition device protruding into the main combustion chamber.

In the following, operation of a gaseous fuel internal combustion engine including pre-chamber assembly 20 is exemplary described with reference to FIGS. 1 to 3 to explain functionality of the ignition system 31 as disclosed herein.

During an intake stroke, a lean air/fuel mixture is supplied to the main combustion chamber 8 via the inlet valve 10. After closing the inlet valve 10, a compression stroke may start wherein the piston 2 moves from the bottom dead center towards the top dead center. During the movement of the piston 2, the lean air/fuel mixture may be at least partially pushed into the pre-chamber 36 via the plurality of flow transfer passages 26 and may be continuously compressed to a maximum motored compressing pressure. The maximum motored compressing pressure is the pressure of the air/fuel mixture within the main combustion chamber 8 at the end of the compression stroke during an engine cycle without an ignition event. For instance, the maximum motored compressing pressure may range from about 50 bar to about 170 bar.

The lean air/fuel mixture may be provided to the main combustion chamber 8 with an air to fuel ratio ranging, for example, from about 1.5 to about 3.0. At the end of the compression stroke, the air/fuel mixture within the main combustion chamber 8 and the pre-chamber 36 may have the above-identified compressing pressure.

Prior initiating the ignition event in the ignition region 38 by the ignition device 34, a preset amount of pressurized fuel may be supplied into the ignition region 38. Then, the pressurized fuel may at least partially mix with the lean air/fuel mixture already present in the ignition region 38, which leads to an enriched ignition region 38. For example, the ignition event may be initiated at times between, for example, about 20° and 0° crank angle and particularly at times between about 5° and 15° crank angle before the top dead center of the piston 2. Therefore, the pressurized fuel may be supplied to the ignition region 38 shortly prior the ignition event is initiated. For example, the pressurized fuel may be supplied to the ignition region at times between about 30° and about 0°, particularly between about 10° and about 2° crank angle before the ignition event is initiated.

Due to the compressing pressure of the air/fuel mixture at the end of the compressing stroke, the pressurized fuel supplied to the ignition region 38 may have a preset pressure greater than an actual pressure of the lean air/fuel mixture within the main combustion chamber 8 and the pre-chamber 36. For instance, the preset pressure may be about 60% to about 150% of the maximum motored compressing pressure. For example, the preset pressure may range from about 50 bar to about 120 bar (up to about 190 bar), particularly from about 70 bar to about 120 bar.

After having supplied pressurized fuel to the ignition region 38, the ignition region 38 is enriched with fuel and, hence includes an air to fuel ratio less than the air to fuel ratio of the lean air/fuel mixture within the main combustion chamber 8 and the pre-chamber 36. Therefore, the pre-chamber 36 includes a stratified charge of combustion mixture, with an enriched combustion mixture in the ignition region 38 and a lean combustion mixture in the rest of the pre-chamber 36. The amount of pressurized fuel supplied to the ignition region 38 is controlled, such that the air to fuel ratio within the ignition region 38 ranges from about 0.5 to about 1.0, preferably between 0.7 and 0.9.

Then, after supply of pressurized fuel to the ignition region 38, the ignition device 34 initiates the ignition event for combusting the enriched air/fuel mixture within the ignition region 38. Then, the burning fuel of the ignition region 38 may further ignite and combust the lean air/fuel mixture in the pre-chamber 36, which in turn may further advance through the flow transfer passages 26 for igniting and combustion the lean/air fuel mixture within the main combustion chamber 8.

It should be appreciated that the operation process described above may similarly apply to an internal combustion engine operating at least partially on gaseous fuel and which does not include a pre-chamber assembly. In such embodiments, the pressurized fuel may be supplied to the ignition region 38 which is located directly in the main combustion chamber 8.

Although the preferred embodiments of this invention have been described herein, improvements and modifications may be incorporated without departing from the scope of the following claims.

The invention claimed is:

1. A spark ignited gaseous fuel internal combustion engine comprising:
   at least one cylinder movably accommodating an associated piston, the at least one cylinder and the associated piston defining a main combustion chamber for combusting an air/fuel mixture therein; and
   at least one ignition system, comprising:
      an ignition device having an igniting portion defining an ignition region, the ignition device being configured to initiate an ignition event in the ignition region for initiating a combustion process in the main combustion chamber; and
      at least one fuel supply channel configured to supply pressurized fuel into the ignition region for enriching the ignition region with fuel, wherein the pressurized fuel is supplied to the ignition region at crank angles between about 30° and about 0° before the ignition event is initiated by the ignition device.

2. The spark ignited gaseous fuel internal combustion engine of claim 1, wherein the at least one fuel supply channel at least partially extends through the ignition device.

3. The spark ignited gaseous fuel internal combustion engine of claim 1, further comprising a pre-chamber assembly including a pre-chamber, the pre-chamber accommodating the ignition device, and the pre-chamber being configured to be fluidly connected to the main combustion chamber.

4. The spark ignited gaseous fuel internal combustion engine of claim 1, wherein the preset pressure is greater than a maximum pressure of the air/fuel mixture within the main combustion chamber at an end of a compression stroke of the internal combustion engine.

5. The spark ignited gaseous fuel internal combustion engine of claim 1, wherein the preset pressure ranges from about 50 bar to about 170 bar.

6. The spark ignited gaseous fuel internal combustion engine of claim 1, wherein the ignition device is a spark plug configured to generate a spark at a spark gap, the ignition region surrounds the spark gap and extends from the spark gap to a distance ranging from about 0.1 mm to about 15 mm.

7. The spark ignited gaseous fuel internal combustion engine of claim 1, further including at least one control valve installed in or fluidly connected upstream of the at least one fuel supply channel to control an amount of the pressurized fuel supplied to the ignition region.

8. The spark ignited gaseous fuel internal combustion engine of claim 1, further including at least one check valve installed in or fluidly connected upstream of the at least one fuel supply channel to selectively allow or disallow a flow of fuel to and from the ignition region.

9. An ignition system for a spark ignited gaseous fuel internal combustion engine including at least one main combustion chamber, the ignition system comprising:
   an ignition device having an igniting portion defining an ignition region, the ignition device being configured to initiate an ignition event in the ignition region for initiating a combustion process in the at least one main combustion chamber; and
   at least one fuel supply channel configured to supply pressurized fuel into the ignition region for enriching the ignition region with fuel, wherein the pressurized fuel is supplied to the ignition region at times between about 30° and about 0° crank angle before the ignition event is initiated by the ignition device.

10. The ignition system of claim 9, wherein the at least one fuel supply channel (146) at least partially extends through the ignition device.

11. The ignition system of claim 9, further comprising a pre-chamber assembly including a pre-chamber and accommodating the ignition device, the pre-chamber being configured to be fluidly connected to the main combustion chamber.

12. The ignition system of claim 9, wherein the at least one fuel supply channel at least partially extends through a cylinder head of the internal combustion engine.

13. The ignition system of claim 9, wherein the pressurized fuel is supplied to the ignition region under a preset pressure greater than a maximum pressure of the air/fuel mixture within the at least one main combustion chamber at an end of a compression stroke of the internal combustion engine.

14. The ignition system of claim 9, wherein the preset pressure ranges from about 70 bar to about 120 bar.

15. The ignition system of claim 9, wherein the ignition device is a spark plug configured to generate a spark at a spark gap, wherein the ignition region surrounds the spark gap and extends to a distance from the spark gap ranging from about 0.1 mm to about 15 mm.

16. The ignition system of claim 9, further comprising:
   at least one control valve installed in or fluidly connected upstream of the at least one fuel supply channel to control an amount of the pressurized fuel supplied to the ignition region; and
   at least one check valve installed in or fluidly connected upstream of the at least one fuel supply channel to selectively allow or disallow a flow of fuel to and from the ignition region.

17. A method for operating a spark ignited gaseous fuel internal combustion engine including at least one main combustion chamber and at least one ignition device configured to initiate an ignition event within an ignition region, the method comprising:
   supplying pressurized fuel to the ignition region at times between about 30° to about 0° crank angle before the ignition event is initiated by the ignition device for enriching the ignition region with fuel; and
   initiating the ignition event in the ignition region for combusting an enriched air/fuel mixture within the ignition region.

18. The method of claim 1, wherein the pressurized fuel is supplied to the ignition region under a preset pressure greater than an actual pressure of an air/fuel mixture within the at least one main combustion chamber.

19. The method of claim 18, wherein the preset pressure of the pressurized fuel supplied to the ignition region is in a range between about 60% to about 140% of a maximum compressing pressure of the air/fuel mixture within the main combustion chamber.

20. The method of claim 18, wherein the preset pressure ranges from about 50 bar to about 170 bar.

* * * * *